United States Patent [19]
Fontaine

[11] 3,763,975
[45] Oct. 9, 1973

[54] BRAKE WITH VEHICLE SPEED & ACCELERATOR CONTROLS

[76] Inventor: John G. Fontaine, 2817 N.E. 26th Ct., Fort Lauderdale, Fla. 33306

[22] Filed: June 12, 1972

[21] Appl. No.: 261,968

[52] U.S. Cl.............. 192/3 TR, 188/170, 192/3 R
[51] Int. Cl............................................. B60k 29/00
[58] Field of Search........................... 192/3 R, 3 TR

[56] References Cited
UNITED STATES PATENTS

| | | | |
|---|---|---|---|
| 2,079,978 | 5/1937 | Weiss | 192/3 TR |
| 2,111,305 | 3/1938 | Whittington | 192/3 TR |
| 2,843,235 | 7/1958 | Weaver | 192/3 TR |
| 2,904,134 | 9/1959 | Cieply | 192/3 TR X |
| 3,426,872 | 2/1969 | Irie et al. | 192/3 TR X |

*Primary Examiner*—Benjamin W. Wyche
*Attorney*—John H. Oltman et al.

[57] ABSTRACT

Automatic braking apparatus for a vehicle including a spring opposed by a fluid pressure system whereby the spring applies the brakes only when the pressure of the fluid falls below a predetermined level, and an adjusting device for setting and limiting the force of the spring so that the braking force will always be the same in any operating conditions. A control system causes release of the fluid pressure upon the occurrence of a predetermined condition or more than one condition. The spring then applies the brakes. The control system may include a speed responsive device which causes release of the fluid pressure when the vehilce stops, and the control system is so arranged that the speed responsive device cannot again cause release of the brakes. The apparatus is capable of operation in different modes, and a selector device is employed to select a particular mode. One of the modes which can be selected by this device is effective to release the brakes without any other conditions occurring so that the vehicle can be worked on or hauled through a wash rack or towed, by way of example. A signal-ling device is employed to provide a warning in case of loss of fluid pressure due to failure.

18 Claims, 3 Drawing Figures

United States Patent [19]
Fontaine
[11] 3,763,975
[45] Oct. 9, 1973
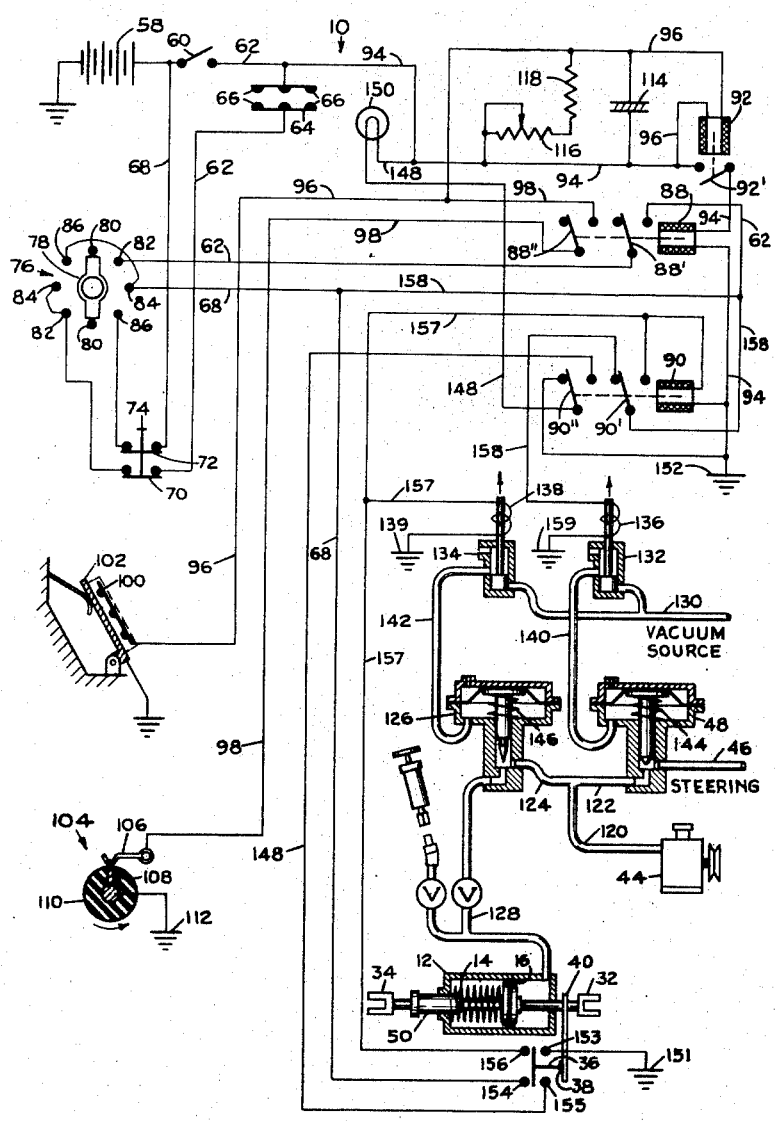

3,763,975

BRAKE WITH VEHICLE SPEED & ACCELERATOR CONTROLS

RELATED APPLICATIONS

This application relates to copending application Ser. No. 135,193 filed on Apr. 19, 1971 by the present inventor.

BACKGROUND OF THE INVENTION

The copending application referred to above describes and claims automatic braking apparatus for vehicles in which the parking and emergency brake of the vehicle is actuated automatically to stop the vehicle or keep the vehicle stopped upon the occurrence of any one of a plurality of conditions. The brakes will be applied when the engine of the vehicle is shut off or stalls, and will also be applied if the driver leaves his seat, or if the service brake pedal should go to the floor by reason of service brake failure. Also, when the vehicle is halted at a crossing or elsewhere on either level or hilly roadway, the brakes will be automatically applied within about three seconds after the vehicle comes to a complete stop to prevent creeping of the vehicle. Each of these features offers special advantages which result in a safe, simple and highly effective automatic braking system for vehicles.

The apparatus includes a spring for applying the emergency brakes, the spring being opposed by fluid pressure such that the emergency brakes are applied only when the fluid pressure falls below a predetermined level. Even when the fluid pressure is at its minimum level, the spring must still overcome this minimum opposing force. Of course, if the engine is turned off, even this minimum force disappears, so the spring could apply too much braking force on the emergency brakes of the vehicle, causing them to skid. If the driver should also apply the service brakes at the same time when the engine is off, the brakes could be damaged.

Other specific problems have been encountered. For example, it has been mentioned that the brakes are applied automatically when the vehicle stops to prevent creeping. In the apparatus of the co-pending application, brake application occurs when a circuit is broken by a speed responsive device. This device includes conducting segments and brushes which produce intermittent current. If some external force, such as wind or other means, should cause one of the segments to make contact with a brush, the brakes would release. The present invention is also directed to solution of this problem.

An improvement has also been needed to provide warning of malfunctions. For example, if fluid pressure should leak off, the brakes could be applied unexpectedly. Some means of overcoming this problem has been needed.

SUMMARY OF THE INVENTION

The present invention provides improvements in the automatic braking apparatus of the copending application identified above. In accordance with the invention, the stroke of the spring of the automatic braking device is controlled to provide proper braking action with the engine running. The stroke of the spring is limited so that when the engine is shut off, the force remains the same. Regardless of what the driver of the vehicle might do, the force always remains equal so too much pressure is never applied to the brakes. With respect to the problem of a conductive segment in the speed responsive device unexpectedly making contact with a brush after the vehicle has been stopped and the creeping control rendered effective, the control system is so arranged that even if a segment should make contact with a brush, the brakes will not be released unless the drive takes some action to positively release the brakes by other means. A mode selector is provided which includes a position for bypassing safety devices in order to release the brakes to allow the vehicle to be towed, or pulled through a car wash, or for other purposes. In the event of loss of brake fluid such that the brake pedal goes all the way to the floor, the brakes will be applied automatically regardless of what position the selector is in. In the event the selector was turned to the service position and an emergency arises, means is provided for applying the brakes. A warning light is included which lights if the fluid pressure opposing the action of the spring should leak off. In this event, the brakes can be released to allow the driver to drive the car to a service station for repair.

The invention will be described with reference to the accompanying drawings.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
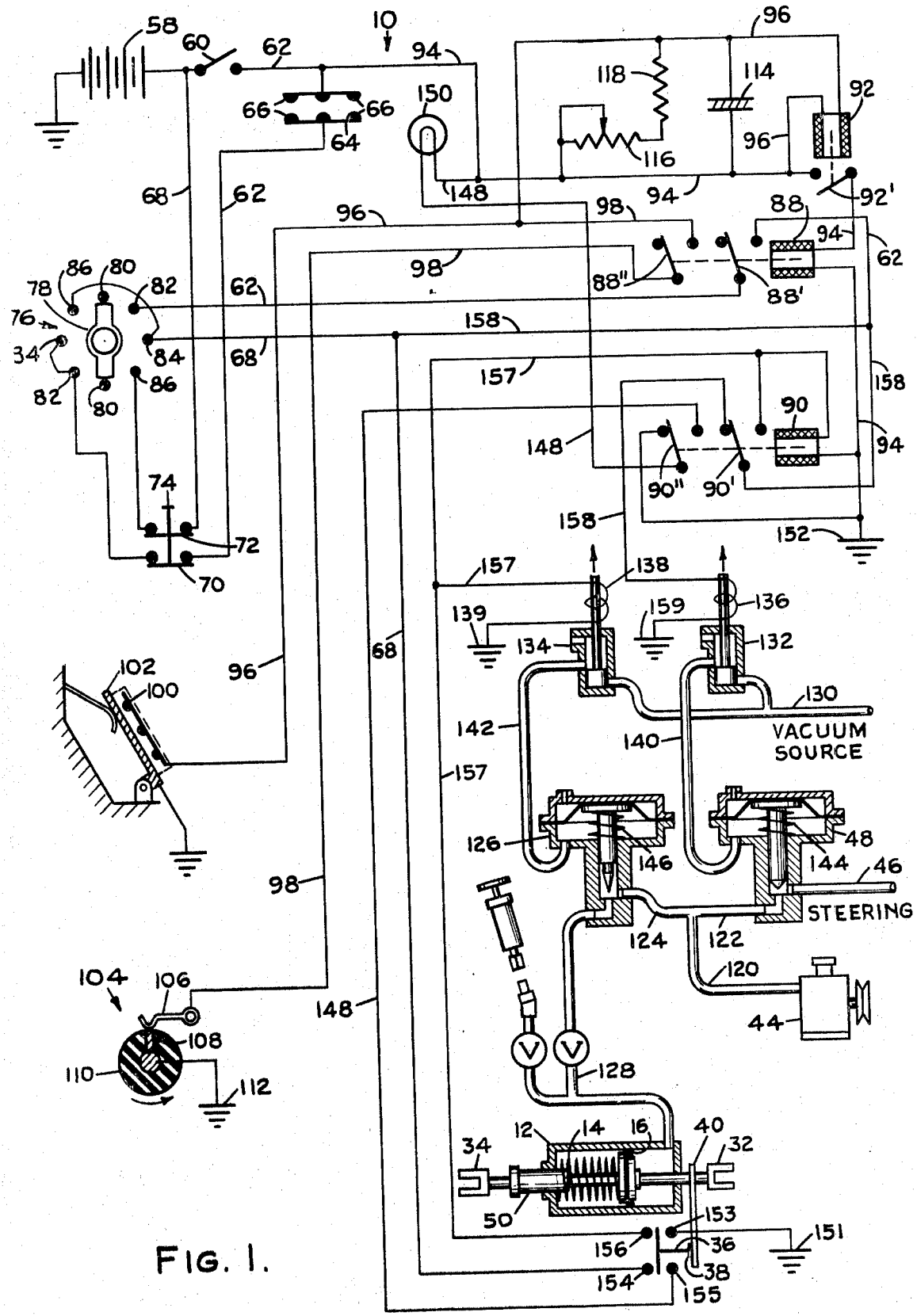
FIG. 1 is a schematic diagram of automatic braking apparatus in accordance with one embodiment of the invention.

The automatic braking apparatus 10 of FIG. 1 is provided in an automotive vehicle such as an automobile, a bus, a truck, or other motor vehicle. The vehicle is provided with conventional brakes which may be actuated by a service brake pedal. The emergency brakes of the vehicle are capable of being actuated manually by the usual lever or handle or the like, and the apparatus 10 provides for automatic actuation of the brakes upon occurrence of any one of a number of predetermined conditions.

Figure 2:
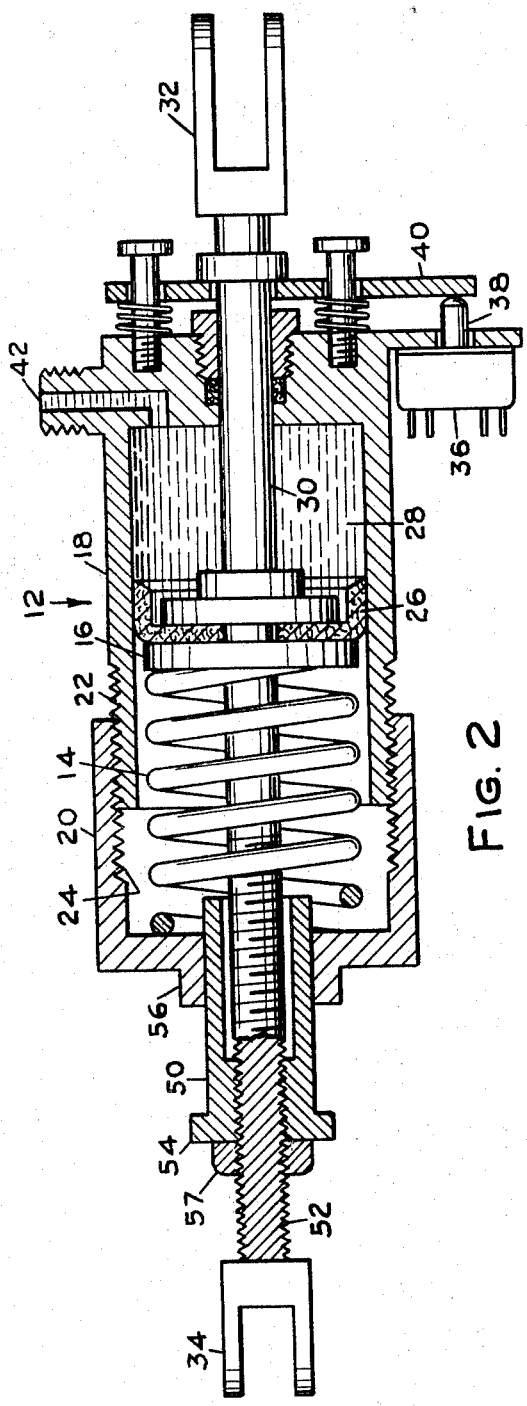
FIG. 2 is a sectional view of a chamber in which a spring is opposed by fluid pressure, the spring being provided with means for limiting its stroke so that braking force applied by the spring will always be the same.

The apparatus 10 includes a chamber 12 in which a spring 14 and a piston 16 are provided. These components are shown more clearly in FIGS. 2 and 3.

The chamber 12 is essentially a cylinder which may consist of two shells 18 and 20 having threads at 22 and 24 so that the shells may be screwed together and adjusted to set the overall length of the chamber. The piston 16 has a sealing membrane 26 which prevents fluid 28 (hydraulic oil) on one side of the piston from leaking to the other side of the piston. The spring 14 is located on the other side of the piston such that the pressure of the fluid 28 opposes the action of the spring 14. In general, the spring 14 applies the braking force when the pressure of the fluid 28 falls below a predetermined level. When the pressure of the fluid 28 exceeds this level, the spring 14 is compressed and the brakes are released.

The piston 16 is mounted on a shaft 30 which extends completely through the chamber 12, and has a clevis 32 at one end thereof for connection to the brake system of the vehicle. Such a system is shown in FIG. 6 of the co-pending application referred to above. The other end of the shaft 30 may have a clevis 34 to which the manual linkage for the emergency brake handle of the vehicle may be connected. A switch 36 is mounted at one end of the cylinder 12, and the actuator 38 is in a position where it can be depressed by an arm 40 mounted on the shaft 30. Thus, the switch 36 is operated in response to motion of the shaft 30 and the spring 14.

Hydraulic fluid 28 is introduced into the chamber 12 through a port 42, and this fluid is under pressure produced by a hydraulic pump 44 provided in the vehicle. The pump 44 may be the power steering pump of the vehicle or a special pump 44 may be installed where no hydraulic steering is provided. When the motor of the vehicle is started, the pump operates to produce fluid pressure. If the pump 44 is a steering pump, it is connected to the steering system of the vehicle through a line 46. When the steering wheel is turned, the flow of fluid is restricted, and the harder the steering wheel is turned, the more the fluid is restricted. The degree of restriction of the fluid will be the degree of the fluid pressure is built up by the pump 44. By way of example, it is not uncommon to obtain a fluid pressure of 1000 psi or more with sufficient restriction. The apparatus 10 includes a restrictive valve 48 which functions to restrict flow of fluid through the line 46 momentarily similar to the manner just referred to in order to build up the pressure produced by the pump 44. This pressure is exerted by the fluid 28 in the cylinder 12, an acts on the piston 16 to oppose the force of the spring 14.

Even when the pump 44 is under no load, with the engine running it still produces a minimum pressure which may be of the order of 85 psi. Thus, the spring 14 must be adjusted, as by setting the two shells 18 and 20, so that even when extended, the spring 14 exerts enough force to overcome the back pressure of the fluid 28. This force might amount to 150–200 psi by way of example. If the engine should be turned off while the vehicle is in motion, and the automatic braking system should apply the brakes, there would be no back pressure on the piston 26 since the fluid 28 would not be pressurized, and this would result in too much brake force on the wheels, causing them to skid.

If the driver, prior to turning off the ignition, would press the service brakes on hard, there would be a force created of the order of 1500 to 2000 psi developed within the braking system. If the drive then turns off the ignition, the emergency brakes would apply adding the force of the emergency brakes to the service brakes. This could damage the brake drums.

Accordingly, the invention provides a means for adjusting the stroke of the spring 14 and the piston 16, this means being in the form of a sleeve 50 which is screwed onto threads 52 on the shaft 30 so that the position of the sleeve 50 can be adjusted by turning it.

Figure 3:
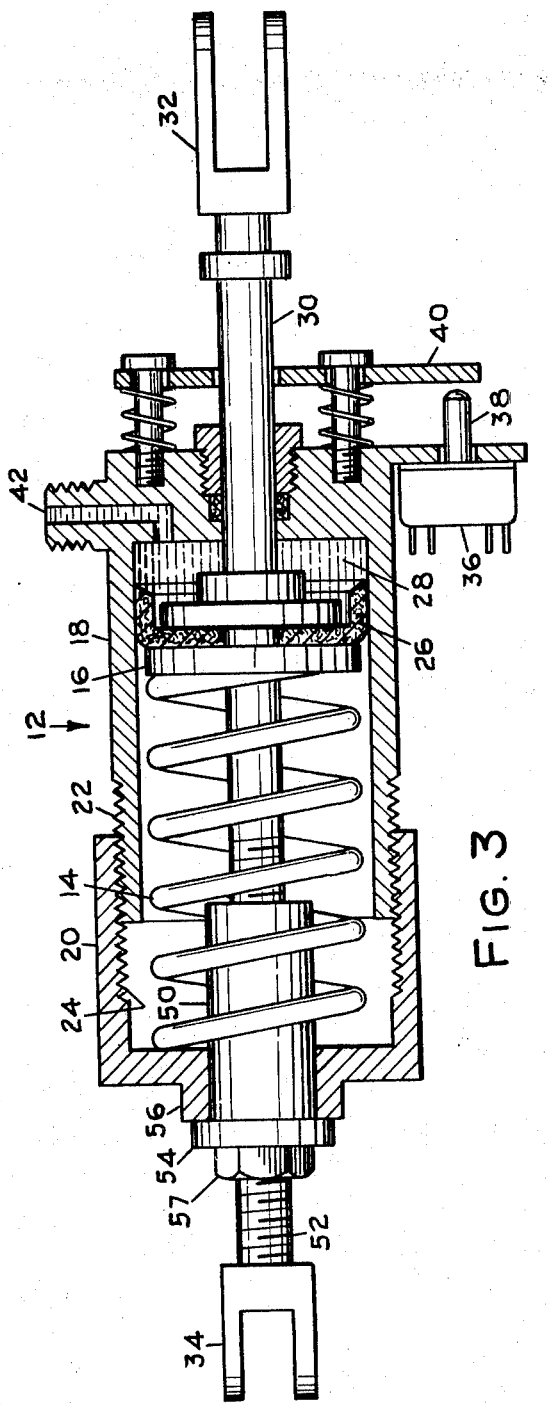
FIG. 3 is a sectional view similar to FIG. 2 showing the spring in its limited extended position.

The sleeve 50 is adjusted so that its flange 54 will butt against the end 56 of the cylinder 12 to limit the stroke of the spring 14 and the piston 16 in the manner shown in FIG. 3. This adjustment is made for proper braking when the engine is running. That is, when the flange 54 butts against end 56 with the engine running, the spring 14 exerts the proper amount of braking force for safe stopping. Lock nut 57 holds sleeve 50 at the proper adjustment. Since the spring is at the limit of its stroke in this condition, the braking force will never exceed this amount. Thus, regardless of what the driver would do, the braking force is limited at this level. In many cases, the brakes of the vehicle are of the self-adjusting type, and as a result, little or no adjustments would need to be made once the original adjustment has been set.

The chamber 12 is shown in FIG. 1, and the manner in which it cooperates with other components of the apparatus 10 will be described with reference to FIG. 1. The battery 58 may be the standard 12 volt battery of an automotive ignition system. The ignition switch is at 60 where it is connected in a circuit path 62 which also connects through another switch 64 that is built into the driver's seat of the vehicle. The switch 64 may have contacts 66 which are normally open, and these contacts may be distributed over the area of the switch 64. The contacts may be separated by a resilient material, and when the driver sits on the seat of the vehicle, the resilient material is compressed allowing the contacts 66 to close. When the driver leaves the seat of the vehicle, the resilient material causes the contacts 66 to separate, thus opening the circuit path 62.

Another circuit path 68 is connected to the battery 58 ahead of the ignition switch 60, so that energization of the circuit path 68 does not depend on operation of the ignition switch 60. Circuit paths 62 and 68 respectively pass through contacts 70 and 72 of a normally closed switch 74 which is actuated by the service brake pedal of the vehicle. The switch 74 may be mounted on the floor of the vehicle under the brake pedal. When the brake pedal goes all the way to the floor, as would happen in the event that fluid pressure was lost in the service brakes of the vehicle, the contacts 70 and 72 would open, thus breaking both circuit path 62 and circuit path 68. This will result in application of the emergency brakes as will be explained.

Circuit paths 62 and 68 connect to a selector switch 76 which has a rotary contact 78. The selector switch 76 has four pairs of contacts designated 80, 82, 84 and 86. The rotary contact 78 has four positions which line up with respective pairs of these contacts. Position 80 will be referred to as the "lock" position, position 82 as the "city" position, position 84 as the "highway" position, and position 86 as the "service" position. Line 68 connects to the service contacts 86, and the upper fixed contact 86 is bridged to the upper contact 84 where line 68 continues.

Line 62 connects to contacts 82, and the lower contacts 82 and 84 are bridged. Line 62 continues from the upper contact 82. Lines 62 and 68 lead to relays 88 and 90, and there is another relay 92 which is connected by line 94 to the ignition switch 60. A line 96 connects through relay 92 to line 94, and line 96 continues to a switch 100 mounted on the accelerator pedal 102 of the vehicle. The switch 100 has the same construction as the switch 64 described previously. Thus, when the driver steps on the accelerator pedal, he closes the normally open switch 100, and when he takes his foot off the accelerator pedal 102, the switch 100 opens to break the circuit 96. Note that circuit 98 branches off from circuit 96, leads through contacts of the relay 88 and connects to a speed responsive device 104 which includes a brush 106, one or more conductive segments 108, and an insulating body 110. The conductive segment or segments 108 contact the brush 106 intermittently as the insulating body 110 rotates, and the segments 108 lead to ground at 112. When a segment 108 contacts the brush 106, the circuit 98 is completed, and when the segment 108 rotates past the brush 106, circuit 98 is broken. The body 110 may be connected in the speedometer cable of the vehicle so that it is rotated whenever the vehicle is moving. When the vehicle stops, the body 110 stops, and normally a segment 108 will not be in contact with the brush 106 when the vehicle stops. This means that circuit 98 is open when the vehicle stops, and this results in application of the brakes after a predetermined delay as will be explained further.

Relay 88 has movable contacts 88' and 88", and relay 90 has movable contacts 90' and 90". Relay 92 has a movable contact 92'. It may be noted that a capacitor 114 is connected between lines 94 and 96 across the relay 92, and resistances 116 and 118 are also connected across the relay between lines 94 and 96. These resistances and the capacitor provide a delay in the operation of the relay 92 of approximately 3-4 seconds, such that when the relay is deactivated, the movable contact 92 does not open until after about 3 seconds. So long as relay 92 is grounded through either speed responsive device 104 or accelerator switch 100, the relay 92 can remain energized. The speed responsive device 104 pulses the relay 92 to keep it energized. However, if one of these circuits is broken for more than about 3 seconds, the relay 92 opens, and this results in application of the brakes as will be described further.

The hydraulic pump 44 supplies hydraulic fluid through lines 120 and 122 to the restrictive valve 48, and also supplies fluid through lines 120 and 124 to a sealing valve 126. From valve 48, the fluid can pass through a line 46 to the steering system of the vehicle. From valve 126, the fluid can pass through a line 128 to the chamber 12. The valves 48 and 126 are both vacuum operated, and vacuum is supplied from a line 130 which leads to a vacuum tank (not show). Line 130 connects to two solenoid valves 132 and 134, both of which are normally closed and can be opened by energization of the coils 136 and 138 respectively. Vacuum is supplied through line 140 from valve 132 to restrictive valve 48 in order to momentarily restrict the valve 48. Vacuum is supplied from valve 134 through line 142 to sealing valve 126 in order to close the sealing valve 126. The valves 148 and 126 are normally kept open by springs 144 and 146.

A line 148 connects from line 94 through a warning lamp 150, and the line 148 connects through movable contact 90" of relay 90 to ground at 152. Contact 90" is normally closed against its left fixed contact, so circuit 148 is completed until the relay 90 is energized. Relay 90 is cycled on and off in the operation of the apparatus as will be explained.

Line 68 connects to the lower left contact 154 of the switch 36, and the upper left contact 156 connects via a line 157 to the relay 90. Line 158 leads through contact 90' of relay 90 and connects back to line 68.

OPERATION

It will be assumed that the selector switch 76 has its rotary contact 78 at position 82 which is the "city" position. When the driver of the vehicle closes ignition switch 60 to start the engine and sits on the driver's seat of the vehicle to close switch 64, circuit 62 is completed through the selector 76. This supplies voltage to movable contact 88' of relay 88, but movable contact 88' is normally at the left fixed contact, so circuit 62 remains open. Voltage is also supplied through line 94 to contact 92' of relay 92, but since circuit 96 has not yet been closed, the relay 92 is not immediately energized. When the driver steps on accelerator pedal 102, switch 100 closes thus completing circuit 96, and relay 92 is then energized to close contact 92' against the left fixed contact of this relay. Circuit 94 is then completed through the coil of relay 88 to ground at 152. Relay 88 then pulls in its movable contacts 88' and 88" against the right fixed contacts of this relay. Relay 90 is not yet energized.

Since voltage exists on movable contact 88', this voltage is transferred through line 62 and line 158 to movable contact 90' of relay 90. Since movable contact 90' is closed against the left fixed contact associated with it, current continues through line 158 and coil 136 to ground at 159. Magnetic valve 132 opens, thus allowing vacuum to enter the restrictive valve 48, and this restricts the flow of hydraulic fluid building up pressure on the hydraulic pump 44 which is running due to the fact that the engine of the vehicle is running. This fluid pressure is supplied through lines 124 and 128 (sealing valve 126 being open) to the chamber 12, and the fluid pressure pushes the piston 16 to the left compressing spring 14 and releasing the brakes.

As the spring compresses, arm 40 moves contact 36 against fixed contacts 154 and 156, thus connecting lines 68 and 157 together Current can then flow from line 62 through movable contact 88', the extension of line 62, line 158 to the left, line 68 downward, contacts 154 and 156, line 157 through the coil of relay 90 to ground at 152.

Relay 90 pulls contacts 90' and 90" to the right against the right fixed contacts associated therewith. Solenoid 132 then closes to open valve 48. Current can flow through lines 62, downward through line 158, through movable contact 90', the right fixed contact associated therewith, and relay 90 to ground at 152, thus latching in relay 90 so that this relay remains energized even if contacts 154 and 156 should again open. Current also flows from movable contact 90' through the right fixed contact and line 157 through coil 138 to ground at 139. The energization of coil 138 causes magnetic valve 134 to open so that vacuum is applied from line 130 through line 142 to the sealing valve 126, causing this valve to close. When the sealing valve 126 closes, the fluid in chamber 12 is trapped in that chamber. Thus, the emergency brakes will not be applied unless valve 126 is opened again, and valve 126 will not open again unless relay 90 is deenergized.

If the ignition switch 60 is opened, lines 94 and 62 are both broken, ultimately causing relay 90 to deenergize and open valve 126 so that spring 14 applies the emergency brakes. If seat switch 64 opens, line 62 is broken, thus causing relay 90 to deenergize resulting in application of the brakes. If switch 74 is opened by the brake pedal being pressed all the way to the floor of the vehicle, line 62 again is opened causing deenergization of relay 90 and allowing spring 14 to apply the brakes. If the driver takes his foot off the accelerator pedal 102, the brakes will not be applied, because the speed responsive device 104 keeps pulsing the relay 92 keeping that relay, and thus relay 90, energized. However, if the driver takes his foot off accelerator pedal 102 and applies the service brakes so that the vehicle stops (assuming a segment 108 is not contacting brush 106) circuits 96 and 98 are both broken, so relay 92 drops out. This causes relay 90 to drop out resulting in application of the emergency brakes. The dropping out of relay 92 is delayed for about 3 seconds by condenser 114. If the vehicle should stop with a segment 108 in contact with brush 106, the vehicle will creep forward very slightly until the segment is out of contact with the brush. At this time the circuit 98 will be broken such that relay 92 drops out after three seconds and the brakes are applied.

It may be noted that once the brakes have been applied in the manner just referred to, relays 88, 90 and 92 are all deenergized. Movable contact 88' is against its left fixed contact, and so opens circuit 98. Thus, even if a segment 108 should accidentally come into contact with brush 106, as for instance if the wind should move the vehicle somewhat, circuit 98 will not again be completed. The relays can again be energized, however, by the driver stepping on accelerator pedal 102, thus closing switch 100 to repeat the cycle of operation referred to previously.

If the fluid pressure in the chamber 12 should leak around the piston 16, the brakes might gradually begin to apply. In this event, movable contact 36 will close against the right fixed contacts 153 and 155. This completes circuit path 148 which leads through lamp 150, movable contact 90'', the right fixed contact associated with this movable contact, fixed contact 155 and fixed contact 153 to ground at 151. Thus, the warning light 150 glows to warn the operator of a malfunction. The warning light may be a standard brake warning light of the vehicle. The driver should then turn the security selector switch 76 to the "highway" position at contacts 84 which bypasses the creeping control and causes the system to recycle so that the vehicle can be driven to a service station for repairs.

With the selector 76 in the "highway" position just referred to, the cycle of operation is very similar to that described above. Voltage is supplied through line 68 and line 158 to movable contact 90' of relay 90. When relay 92 is energized in the manner described previously, relay 88 is energized causing solenoid valve 132 to open resulting in restriction of valve 48. Thus, high pressure fluid is applied to the chamber 12 releasing the brakes. This closes contacts 154 and 156, so current can flow through line 157 and relay 90 causing relay 90 to energize. Contact 90' closes against its right fixed contact, so current can flow through the line 158, movable contact 90', its right fixed contact and relay coil 90 to ground at 152 keeping the relay 90 latched in. Solenoid 132 closes and valve 48 opens. Current can also flow through line 157 and the coil 138 to ground at 139, thus opening solenoid valve 134. This closes sealing valve 126, thus trapping the fluid in the chamber 12 and keeping the brakes released. The brakes can be applied by opening of any of the switches 60, 64 or 74 in the manner described previously since line 158 is hot. Opening of switches 100 or 106 will not cause relay 90 to drop out, so the creeping control is bypassed.

If selector switch 76 is turned to the "service" position at contacts 86, current flows through line 68 and contacts 86 to the extension of line 68 and also to line 158 which connects thereto. This again places voltage on line 158 so that the system can be operated without closing ignition switch 60 and even if the driver of the vehicle is not on the seat so that switch switch 64 is open.

It will be noted that in the event the selector switch 76 shall inadvertently be left in the service position and the service brakes are applied when there is no hydraulic pressure, the service brake pedal will go to the floor and open switch 74. This automatically applies the emergency brakes for safety purposes.

Thus, the invention provides several improvements over the basic system described and claimed in the copending application referred to above. These improvements make the system safer and more effective, and they can be implemented conveniently and without undue cost.

Having thus described my invention, I claim:

1. A brake mechanism for a vehicle having spring means opposed by fluid pressure means whereby the spring means applies the brakes only when the pressure of said fluid pressure means falls below a predetermined level, and adjusting means for setting and limiting the force of said spring means, said fluid pressure means having control means for causing release of the fluid pressure when the vehicle stops, and said control means including speed responsive means in a first circuit which is broken when the vehicle stops, and acceleration responsive means in a second circuit which is broken when an accelerator is deactivated.

2. The brake mechanism as claimed in claim 1 in which said first circuit is ineffective to release the brakes when said second circuit is broken even if said first circuit is no longer broken by said speed responsive means.

3. The brake mechanism as claimed in claim 2 in which said control means has contacts breaking said first circuit except when said second circuit is completed.

4. The brake mechanism as claimed in claim 3 in which said contacts are part of a relay.

5. The brake mechanism as claimed in claim 1 in which said control means further includes a third circuit bypassing said first and second circuit and including switch contacts effective to release the brakes when closed.

6. The brake mechanism as claimed in claim 5 in which said switch contacts are part of a rotary switch means.

7. The brake mechanism as claimed in claim 1 in which said control means includes a warning light, and means responsive to said spring for causing said light to glow when said spring begins to extend and said control means has activated said fluid pressure means.

8. A brake mechanism including a chamber, a piston in said chamber, fluid pressure means for producing fluid pressure on said piston to effect release of brakes, spring means effective on the brakes to cause application of the brakes whenever the fluid pressure falls below a predetermined level, and control means for causing release of the fluid pressure upon a predetermined condition, said control means including speed responsive means in a first circuit which is broken when the vehicle stops, accelerator responsive means in a second circuit which is broken when an accelerator is deactivated, and contacts breaking said first circuit except when said second circuit is completed, so that said first circuit is ineffective to release the brakes when said second circuit is broken even if said first circuit is no longer broken by said speed responsive means.

9. The brake mechanism as claimed in claim 8 in which said contacts are part of a relay.

10. The brake mechanism as claimed in claim 9 in which said control means further includes a third circuit bypassing said first and second circuits and including switch contacts effective to release the brakes when closed.

11. The brake mechanism as claimed in claim 10 in which said switch contacts are part of a rotary switch means.

12. The brake mechanism as claimed in claim 8 in which said control means includes a warning light, and means responsive to said spring for causing said warning light to glow when said spring is extended and said control means has activated said fluid pressure means.

13. A brake mechanism for a vehicle having spring means opposed by fluid pressure means whereby the spring means applies the brakes only when the pressure of said fluid pressure means falls below a predetermined level, said fluid pressure means having control means for causing release of the fluid pressure upon a predetermined condition, said control means including speed responsive means in a first circuit which is broken when the vehicle stops, accelerator responsive means in a second circuit which is broken when an accelerator of the vehicle is deactivated, and contacts breaking said first circuit except when said second circuit is completed, so that said first circuit is ineffective to release the brakes when said second circuit is broken even if said first circuit is no longer broken by said speed responsive means.

14. The brake mechanism as claimed in claim 13 in which said contacts are part of a relay.

15. The brake mechanism as claimed in claim 14 in which said control means further includes a third circuit bypassing said first and second circuits and including switch contacts effective when closed to release the brakes.

16. The brake mechanism as claimed in claim 15 in which said switch contacts are part of a rotary switch means.

17. The brake mechanism as claimed in claim 13 in which said control means includes a warning light, and means responsive to said spring for causing said light to glow when said spring begins to extend and said control means has activated said fluid pressure means.

18. The brake mechanism as claimed in claim 13 in which said control means includes vacuum controlled valve means.

* * * * *